United States Patent [19]

Berg, Jr.

[11] 4,077,509
[45] Mar. 7, 1978

[54] MANURE PUMP

[76] Inventor: Vernon R. Berg, Jr., 413 W. Park St., Marshfield, Wis. 54449

[21] Appl. No.: 690,472

[22] Filed: May 27, 1976

[51] Int. Cl.² .............................................. B65G 25/04
[52] U.S. Cl. .................................... 198/747; 198/533; 198/616
[58] Field of Search ............... 198/531, 532, 533, 534, 198/540, 550, 616, 736, 747, 755, 772, 582; 214/16 R, 17 R, 17 A, 18.28, 23; 100/179, 187, 190

[56] References Cited

U.S. PATENT DOCUMENTS

| | | | |
|---|---|---|---|
| 570,947 | 11/1896 | Neill | 100/179 |
| 1,472,280 | 10/1923 | Ousdahl | 198/533 |
| 1,813,625 | 7/1931 | Knox | 243/2 |
| 1,968,407 | 7/1934 | Leach | 198/747 |
| 2,238,944 | 4/1941 | Muller et al. | 198/540 |
| 2,539,780 | 1/1951 | Hall | 198/533 |
| 2,660,949 | 12/1953 | Russell | 100/187 |
| 2,833,389 | 5/1958 | Bergmann | 198/755 |
| 3,103,276 | 9/1963 | Schmitzer | 198/747 |
| 3,872,981 | 9/1973 | Hedlund | 198/531 |
| 3,995,734 | 12/1976 | Berg, Jr. | 198/747 |

FOREIGN PATENT DOCUMENTS

| | | | |
|---|---|---|---|
| 2,035,922 | 2/1972 | Germany | 198/540 |
| 170,545 | 7/1934 | Switzerland | 198/736 |
| 23,944 of | 1896 | United Kingdom | 100/187 |

*Primary Examiner*—John J. Love
*Assistant Examiner*—Richard K. Thomson
*Attorney, Agent, or Firm*—Henry C. Fuller

[57] ABSTRACT

Pumping apparatus for conveying animal waste from a livestock housing to a remote storage area includes a hopper with one downwardly inclined hopper surface with the other surfaces of the hopper being vertical and in which the inclined surface supports an agitating plate which oscillates and minimizes bridging of straw across the hopper walls. The agitating plate is oscillated by a motor driven crank. Spray tubes arranged around the vertical and inclined walls provide a water curtain to further minimize sticking and bridging of the manure in the hopper. Other features of the invention include a reducing cone to reduce the diameter of the pumping chamber to that of the discharge pipe with the reducing cone provided with check valves to prevent back flow of manure from the storage area through the pump and into the livestock housing when the pump is not in use. A circuit is provided to stop the ram in a down position in the pumping chamber when the pump is not in use to further prevent backflow into the livestock facility.

7 Claims, 10 Drawing Figures

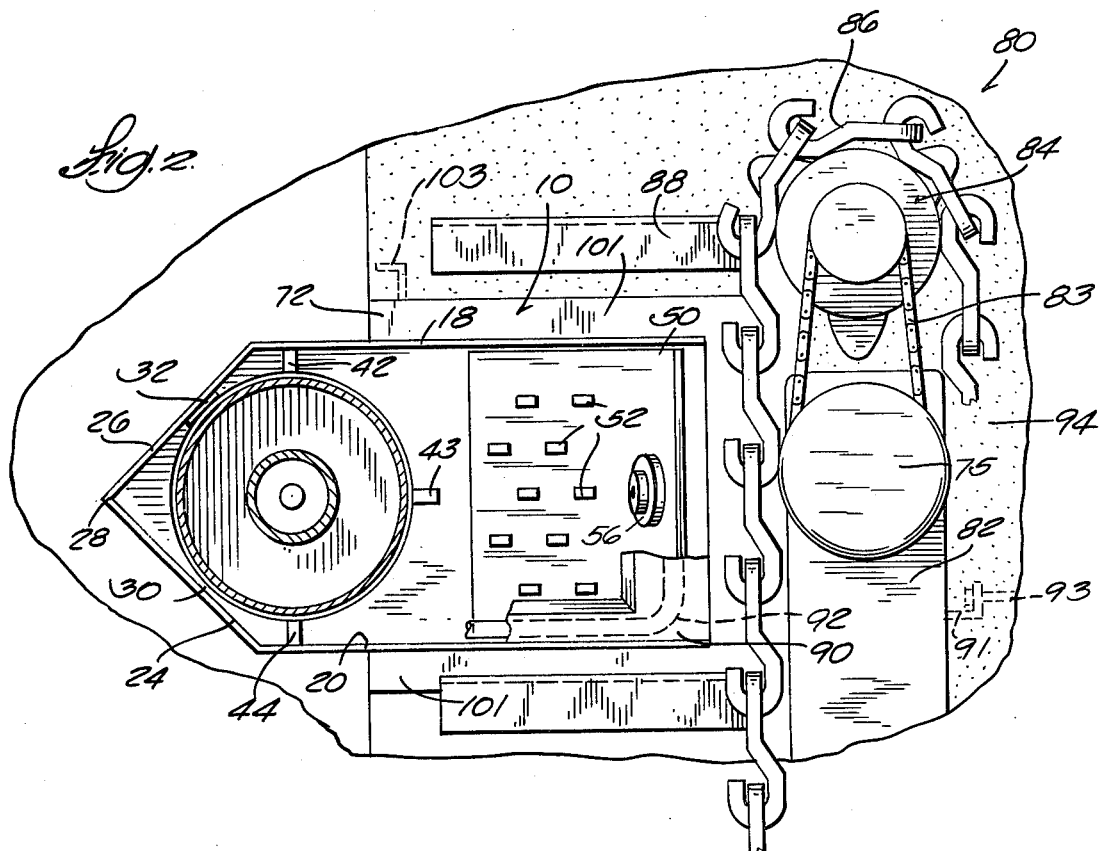
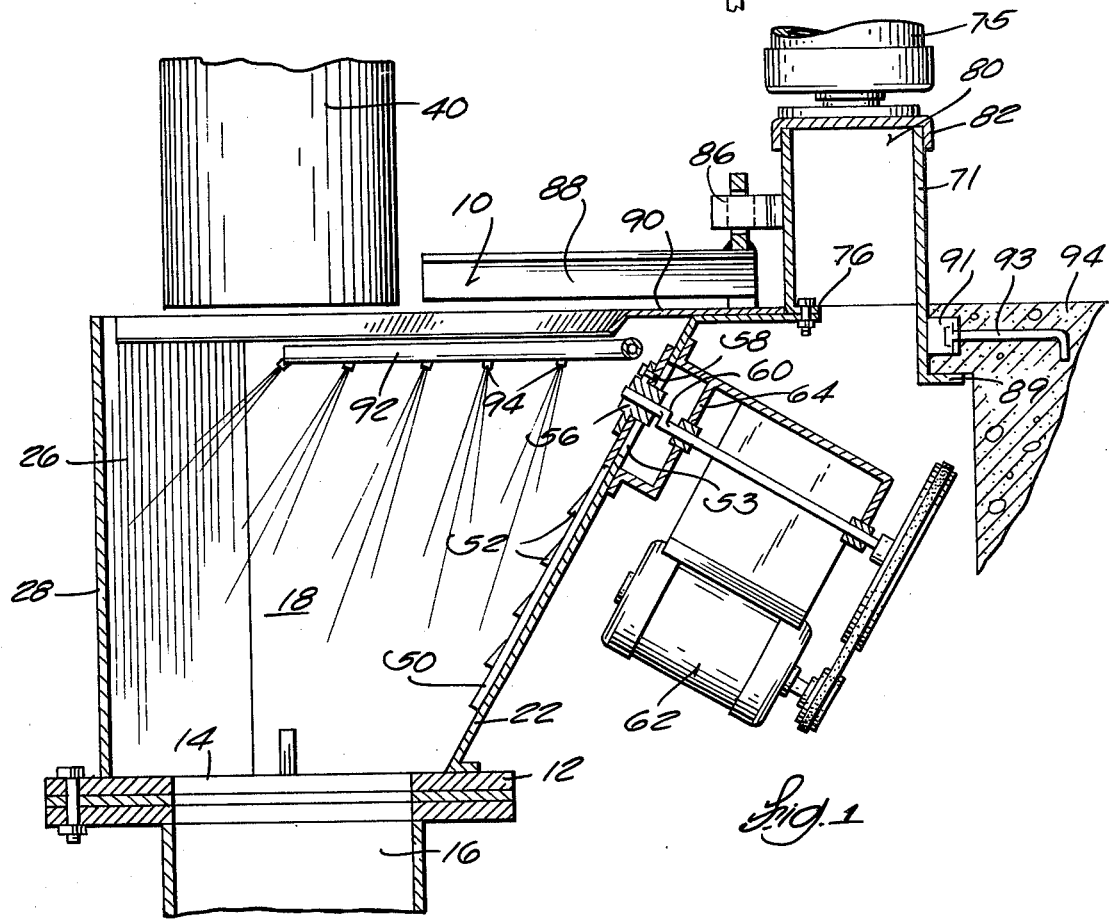

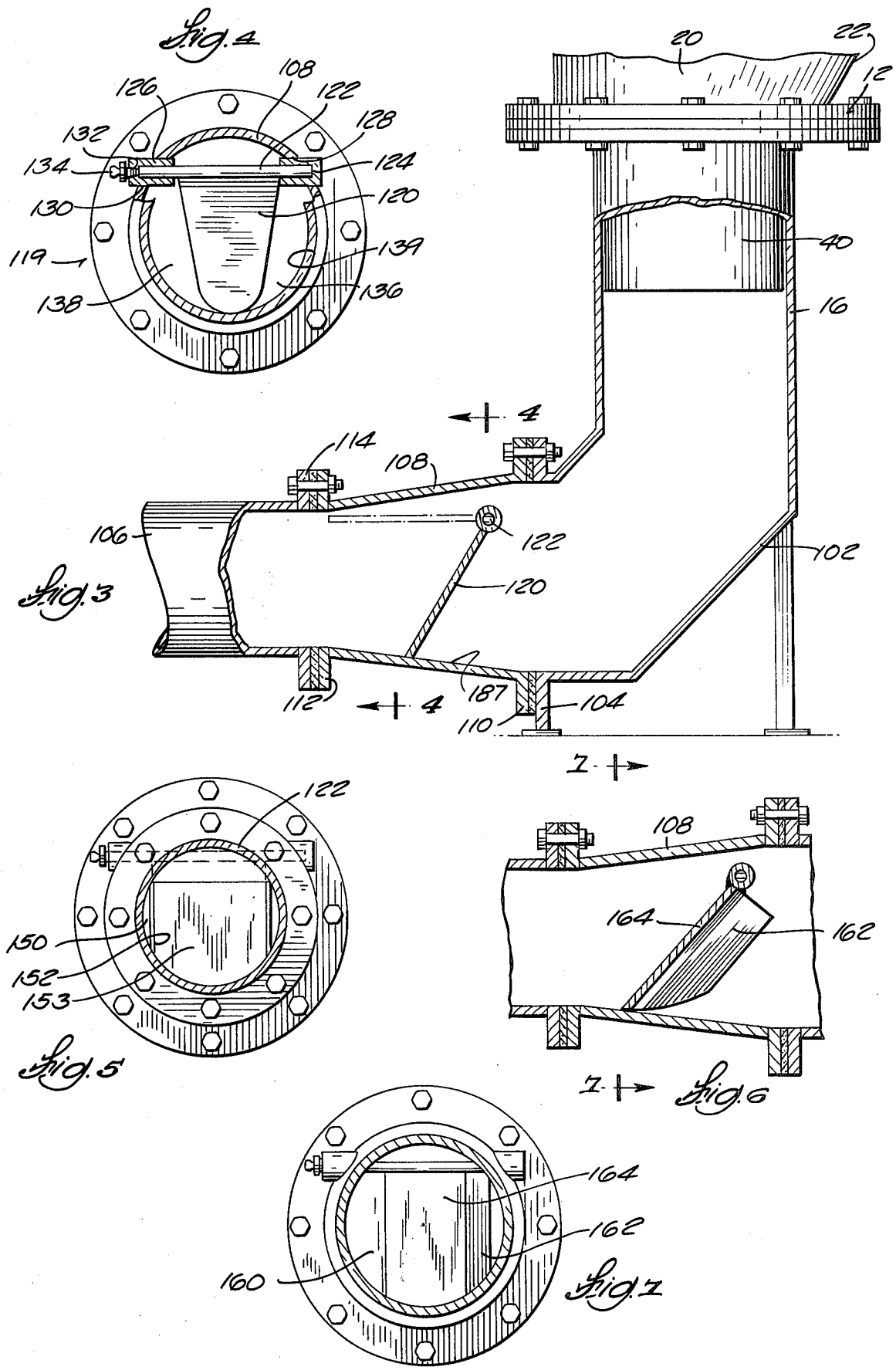

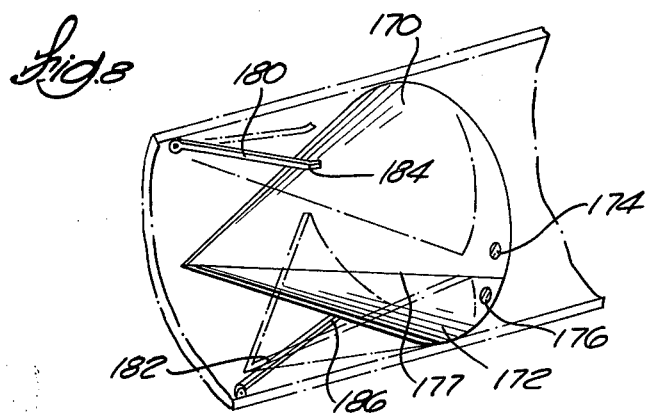
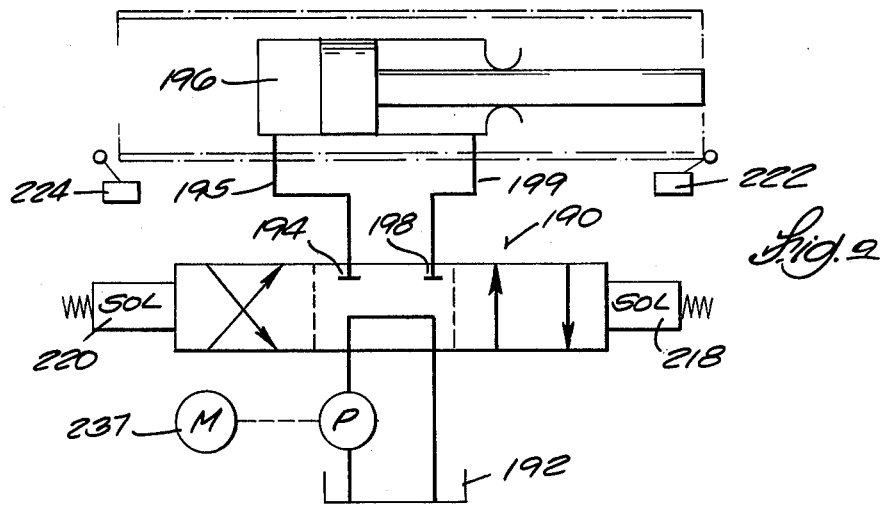
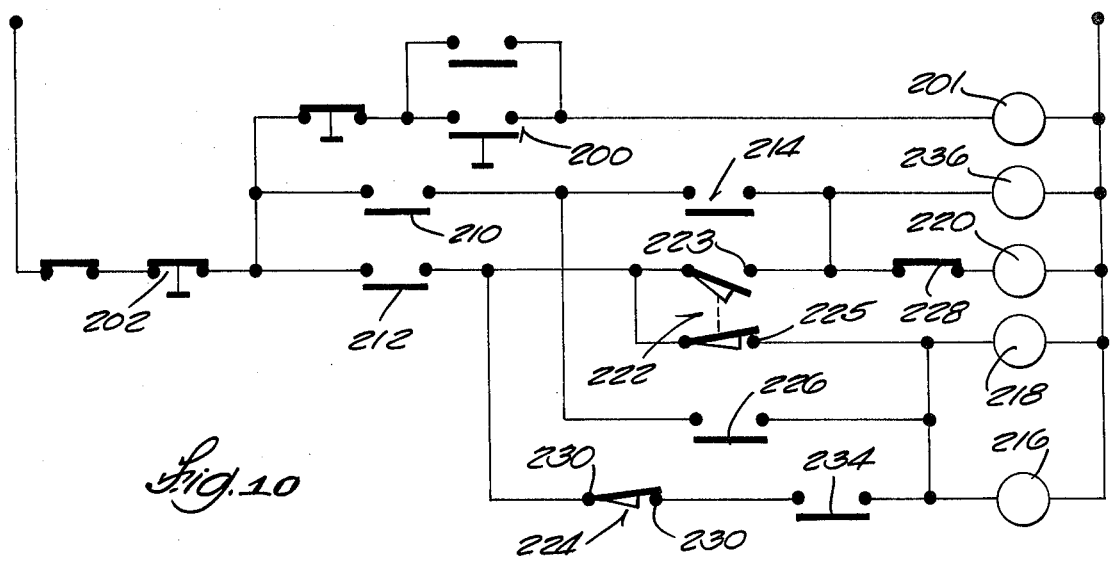

MANURE PUMP

BACKGROUND OF INVENTION

This application is a further development of the subject matter of my prior application Ser. No. 549,633 filed Feb. 13, 1975, now U.S. Pat. No. 3,995,734. One of the problems faced by the prior art manure pumping systems is the bridging of straw or other livestock bedding in the hopper which supplies the animal waste to the pumping chamber. The manure and straw are typically delivered to the hopper by a conventional barn cleaner having a chain with flights which travel a circuit through a barn gutter to sweep or push the manure from the gutter to the manure pump hopper. When bridging occurs, the manure is not removed from the hopper and accumulates at the hopper as the barn cleaner chain continues to deliver manure to the hopper. The spill-over at the hopper then requires manual feed of the manure into the hopper until the bridging is overcome. The present invention provides a hopper construction and apparatus to minimize straw bridging and facilitate feed of material from the hopper into the pumping chamber.

SUMMARY OF INVENTION

The invention provides a hopper which employs all vertical walls except one inclined wall which is directed at the pumping chamber inlet. The inclined wall supports an agitator plate which is oscillated by a crank to cause the hopper load to be shifted downwardly toward the pumping chamber inlet. The agitator plate is provided with projections or barbs which facilitate the downward shifting of the hopper contents. The vertical walls of the hopper also minimize the straw bridging which can otherwise occur between the hopper walls. Water is injected into the hopper by a U-shaped tube which partially circumscribes the inside of the hopper and provides a water curtain which enhances material flow toward the pumping chamber inlet.

The invention also provides for hopper flanges or brackets which enable concrete to be poured around the hopper inlet to provide a concrete deck which is flush with the top of the hopper. The barn cleaner chain flights thus, sweep the animal wastes directly from the concrete deck into the hopper.

Various check valves are provided for a reducing cone which connects the elbow on the pumping chamber to the discharge pipe. The various designs of check valves are adapted for particular types of manure.

The invention also provides an electrical circuit which cooperates with the hydraulic circuit which operates the ram to stop the ram in the down position within the pumping chamber when the apparatus is not in use, with the ram thus sealing the pumping chamber to prevent backflow from the manure holding pit into the livestock facility.

Further objects, features and advantages of the invention will become apparent from the following disclosure.

DESCRIPTION OF DRAWINGS

FIG. 1 is a fragmentary elevational view of pumping apparatus in accordance with the invention.

FIG. 2 is a plan view of the apparatus shown in FIG. 1.

FIG. 3 is a side elevational view in partial section of the hopper pumping chamber, reducing cone of discharge pipe.

FIG. 4 is a view of a check valve in the reducing cone along line 4—4 of FIG. 3.

FIG. 5 is a view similar to FIG. 4 of a modified form of a check member in a reducing cone.

FIG. 6 is a sectional view through the reducing cone of a further modified embodiment of a check valve in a reducing cone.

FIG. 7 is a view along line 7—7 of FIG. 6.

FIG. 8 is a fragmentary perspective view of a further modified embodiment of a check valve.

FIG. 9 is a diagrammatic view of a hydraulic circuit for operating the ram.

FIG. 10 is a schematic diagram of an electrical circuit for operating the ram.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIGS. 1 and 2 show a hopper 10 connected to a flange 12 which defines an inlet 14 for a pumping chamber 16. The hopper includes spaced vertical hopper walls 18, 20 which also are connected to the flange 12. The hopper 10 includes a downwardly and inwardly inclined wall 22 which is connected at its side edges to the hopper walls 18, 20. The hopper 10 also includes two vertical walls 24, 26 with wall 26 being connected to wall 18 and wall 24 connected to wall 20. Walls 24, 26 are connected at 28. The vertical walls 24, 26 are provided with wear shoes 30, 32 for guiding movement of the ram 40 into the pumping chamber inlet 14. Wear shoes 42, 43 and 44 can also be provided to guide piston movement.

Various configurations of hoppers have been employed with manure pumping apparatus. In my prior application, Ser. No. 549,633, now U.S. Pat. No. 3,995,734 all hopper walls, except the rear wall adjacent the ram, are inclined. While this hopper construction is suitable for manure relatively free of bedding straw such as that found in free-stall barns, where livestock bedding is used, the straw has a tendency to bridge between the hopper walls and prevent flow into the pumping chamber. Thus, the waste material accumulates above the hopper and the barn cleaner flights will sweep the accumulated manure around the barn as the barn cleaner chain makes its circuit. Use of the vertical walls minimizes straw bridging as disclosed herein.

In accordance with the invention, the inclined wall 22 of the hopper is provided with an agitator plate 50 which is supported on the inclined wall 22 and oscillates to enhance material flow into the pumping chamber inlet 14. In the disclosed construction, the plate 50 substantially spans the inclined hopper wall 22. The agitator plate 50 also is provided with a plurality of projections or barbs 52 which can be wedge-shaped pieces of metal welded to the plate 50. Means are provided for oscillating the agitator plate 50. In the disclosed construction, the means includes a bearing block 56 (FIG. 1) which is fixed by bolts 58 to the plate 50 and extends through an enlarged opening 53 in the hopper wall 22. A crank 60 is journaled in the bearing block 56 and the crank is rotated by a motor and pulley assembly 62. A bracket 64 connected to hopper wall 22 carries the motor and crank assembly 62. The oscillating motion of the crank 60 is imparted to the agitator plate to provide an oscillation that will prevent bridging and induce flow of hopper contents toward the pumping chamber inlet 14.

The invention also provides a beam 71 (FIG. 1) for partially supporting the hopper and for mounting of the barn cleaner drive unit motor 75.

The beam 71 has a flange 76 which is fastened to the forward and sloping wall 22 of the hopper. The barn cleaner 80 has a yoke 82 which straddles the beam 71. The yoke 82 supports the complete barn cleaner drive assembly including the drive motor 75, drive sprocket 84 and a drive chain 83 which rotates the sprocket 84. The sprocket 84 drives the barn cleaner chain 86 which carries the barn cleaner flights 88. The beam 71 can also be provided with an outturned flange 89 and a series of apertured tabs 91 which connect to concrete reinforcing rods 93 in the concrete deck 94. Thus, the beam 71 ties the hopper 10 and barn cleaner assembly to the concrete deck 94. Similar flanges 101 and tabs 103 are provided along the side walls 18 and 20 to enable concrete support of the hopper walls 18 and 20 and to enable concrete to be poured up to the hopper walls, to seal the hopper 10 and prevent manure spillage around the hopper in the concrete pit in which the hopper is located.

A flange 90 can be provided to shield a water spray tube 92 which is located inside the hopper and provide with a plurality of apertures 94 to provide a water curtain for the hopper walls and thus, enhance the flow capabilities from the hopper 10 into the pumping chamber 16.

The pumping chamber 16 is provided with an integrally formed elbow portion 102 which terminates in a laterally extending flange 104. To reduce the pumping chamber diameter to the diameter of the discharge pipe 106, a reducing cone 108 is provided. The reducing cone 108 has a tapered wall which tapers inwardly in a downstream direction. The tapered wall is provided with peripheral flanges 110 and 112 which are provided with bolt apertures which register with apertures in the flange 104 and the flange 114 of the discharge pipe. In some installations, a check valve is desirable to prevent backflow of manure from the discharge pipe into the hopper. This can occur where the discharge pit or a manure storage tank or the level of manure in the tank is above the hopper or pumping chamber.

FIG. 4 illustrates a check valve assembly 119 with a check member 120 which tapers downwardly from a supporting shaft 122. The supporting shaft 122 is supported in the reducing cone 108 interior by two bearings 124 and 126 which are located in apertures 128 and 130 in the cone 108 and secured by welding or otherwise in the aperture 128, 130. The bearings 124, 126 can be provided with threaded apertures 132 which receive grease fittings 134. The grease fittings 134 seal the bearings to prevent manure flow through the bearing and also enable lubrication of the bearings and shaft 122. The check member 120 illustrated in FIG. 4 is desirably used where the manure is characterized by large quantities of bedding straw. When pumping manure with large quantities of straw, the straw downstream of a check valve can prevent a valve from opening if the valve completely occupies the cross section of the reducing cone 108. With the check member illustrated in FIG. 4, the gaps 136, 138 between the edges of the check member 120 and the inside surface 139 of the cone 108 enables liquids to be pumped past the check member 120 which can wash the straw away from the check member 120 so that it can open. With heavy straw, the back pressure in the direction of the hopper causes the heavy straw to block and seal the openings 136, 138 when the pump is not in use.

FIG. 5 is a further embodiment of a check member. The reducing cone 108 and is provided with a D-shaped aperture 152. The cut-out from the aperture 152 is supported by a shaft 122 in bearing 124, 126 to provide a check member 153. The check member 153 provides a good seal against backflow when pumping liquid manure.

The check valve 164 shown in FIGS. 6 and 7 is somewhat similar to that shown in FIG. 4, except that wings 160, 162 have been welded on the check member 164 to occupy more of the cross section of the reducing cone 108. The wings extend upstream to provide clearance when the check member swings into the progressively reduced diameter of the cone 108. The check valve 164 is suitable for small quantities of straw.

The check valve shown in FIG. 8 includes two check members 170, 172 with each of the check members defined by semiconical wall portions. The check members 170, 172 are pivotally supported to the reducing cone by shafts 174, 176. The two check members meet along a split line 177. The check members are shown in the closed sealing position in full lines and in the open position in dotted lines. Leaf springs 180, 182 are anchored to the inside wall of the reducing cone and have free ends 184, 186 which bear against the check members to urge the check members to the closed full line position. The conical shape of the check valves shown in FIG. 8 is desirable because it fits within the reducing cone and requires a minimum of return motion to move from the open to the closed position. This minimizes the amount of material which will backflow through the pumping chamber before the check valve closes.

All of the check valves disclosed herein extend from the support shaft a distance such that they engage the bottom 187 of the reducing cone 108 as illustrated in FIG. 3 to prevent the valve member from passing a centered position beneath the shaft 122.

In accordance with the invention, hydraulic and electrical circuit means are provided to stop the ram 40 in the down position in the pumping chamber as shown in FIG. 3 when the pump is not in use. Thus, the ram will seal the pumping chamber and prevent backflow of manure through the discharge pipe, the pumping chamber and into the hopper. Where the manure storage pit or tank is located above the level of the hopper, gravity and backflow of the manure could result in large quantities of manure flooding the pump area and barn. FIG. 9 shows a solenoid valve 190 which is a three-position, spring-centered double solenoid with both cylinder ports blocked with pressure recirculation to a reservoir 192 when the valve spool is in the centered position. Port 194 is connected by conduit 195 to one side of the cylinder 196 which operates the ram and port 198 is connected by conduit 199 to the opposite side of the ram. When the valve spool is in one position there is fluid flow through line 195 to the hydraulic cylinder 196 and the opposite position of center fluid flow from line 198, to the cylinder 196 on the opposite side of the piston. When the valve spool is centered both ports 194, 198 are sealed and the hydraulic cylinder locked, to lock the ram in the down position.

FIG. 10 shows electrical circuit employed to operate the hydraulic pump motor and barn cleaner motor. Switch 200 is the barn cleaner motor START switch and operates the barn cleaner motor contactor coil 201. Switch 202 is an emergency STOP switch. Switches 210, 214 and 226 are all manually controlled by the same knob. To start the sequence, switches 210, 214 and 226 are closed and current goes to the contactor coil 236 for the electric motor 237 (FIG. 9) which operates the hydraulic pump. When 236 is energized it closes contacts 212 and switch 210, 214 and 226 can be released.

When the ram 40 is started at the bottom of the stroke, the contacts 223 of limit switch 222 (FIGS. 9, 10) are open and contacts 225 of limit switch 222 are closed. The contacts 230 of limit switch 224 are closed. Current goes through contacts 225 to energize solenoid coil 218 to provide fluid through conduit 199 to the hydraulic cylinder. The UP relay 216 closes contacts 234 and establishes a holding circuit so you can release manually the START switches 210, 214 and 216 once the cycle is started.

When limit switch 224 is engaged by the ram 40, limit switch contacts open dropping the holding circuit to relay 216 which de-energizes 218 as well as coil 216. At the same time, contacts 228 operated by coil 216, close and current is available to energize solenoid coil 220 to cause downward movement of the ram 40.

To stop ram movement, switch 210, 214, 226 is switched to the OFF position and the contacts for switch 214 open the circuit pump motor contactor coil 236 through switch 214. Current then can only energize coil 226 through the DOWN limit switch contacts 223. When the ram goes down and limit switch 222 is engaged and contacts 223 opened, the pump motor contactor coil 236 is de-energized. Any time coil 236 is de-energized and contacts 223 opened, there is no voltage available for either the solenoid valves 218, 220 and the valve spool is centered by springs to close the ports 194, 198 and lock the ram in the down position.

Inasmuch as the valve is spring centered, the ram can be stopped in any suitable position for service work by actuating the emergency stop. In the event of power failure, the ram will stop at the position it is at when the failure occurs.

I claim:

1. Apparatus for pumping animal waste from a livestock facility to a remote storage area comprising a pumping chamber having an upwardly open inlet, the improvement comprising a hopper located above and surrounding said inlet, said hopper having first and second spaced vertical walls and a downwardly inclined third wall interconnecting said first and second walls, an agitator plate substantially spanning said inclined wall, means for supporting said agitating plate on said inclined wall for reciprocating movement thereon, and means for reciprocating said agitator plate to induce flow of material in contact therewith into said inlet, said last named means comprising a bearing connected to said agitation plate, a crank arm having a shank portion journaled in said bearing block, and means for rotating said crank arm about an axis generally perpendicular to said agitating plate to afford agitating and orbital movement of said agitator plate relative to said crank arm.

2. The improvement of claim 1 wherein said agitator plate is provided with a plurality of triangular shaped projections to engage hopper contents, said projections being welded to said plate and upstanding therefrom.

3. The improvement of claim 1 including peripheral flanges connected to each of said hopper walls, and flanges having depending portions and laterally outwardly extending portions and apertures in said downwardly extending portions for connection to concrete reinforcing rods and including a concrete deck surrounding said hopper.

4. Apparatus for pumping animal waste from a livestock facility to a remote storage area comprising a pumping chamber having an upwardly open inlet, the improvement comprising a hopper located above and surrounding said inlet, said hopper having first and second spaced vertical walls and a downwardly inclined third wall interconnecting said first and second walls including a ram operatively associated with said hopper and said pumping chamber, fourth and fifth vertical hopper walls with said fourth wall connected to said first wall and said fifth wall connected to said second wall and said fourth and fifth walls interconnected at a common juncture and oriented in planes generally tangent to said ram and guide shoes on said first and second and fourth and fifth walls in guiding engagement with said ram, and wherein a vertical plane through said juncture of said fourth and first walls and the juncture between said fifth and second walls is non-diameteral with respect to said ram.

5. Apparatus for pumping animal waste from a livestock facility to a remote storage area including a hopper, a pumping chamber having an inlet for receiving manure from said hopper and a discharge outlet, a ram operatively associated with said hopper and said pumping chamber to move manure into said pumping chamber, a hydraulic cylinder for operating said ram and hydraulic and electrical circuit means for reciprocating said cylinder, said circuit means including a three position spring centered solenoid having fluid ports for pressurizing said ram for movement in first and second directions, with said ports being blocked when said solenoid is de-energized to stop said ram in said pumping chamber to seal said hopper and prevent backflow of manure from said pumping chamber into said hopper.

6. Apparatus for pumping animal waste from a livestock facility to a remote storage area including a hopper having a wall portion with a laterally extending flange adjacent the top, a pumping chamber having an inlet for receiving manure from said hopper and a discharge outlet, a ram operatively associated with said hopper and said pumping chamber to move manure into said pumping chamber, a barn cleaner assembly including a drive motor and a sprocket for driving a barn cleaner chain said assembly including a supporting yoke and a beam connected to said hopper flange and receiving said yoke to support said barn cleaner assembly and means on said beam for anchoring said beam in concrete.

7. Apparatus for pumping animal waste from a livestock facility to a remote storage area including a hopper, a pumping chamber having an inlet for receiving manure form said hopper and a discharge outlet, a ram operatively associated with said hopper and said pumping chamber to move manure into said pumping chamber, a hydraulic cylinder for operating said ram and hydraulic and electrical circuit means for reciprocating said cylinder, said circuit means including a valve to control fluid flow to both sides of said hydraulic cylinder and limit switch means to control said valve, said limit switches and said valve being operative to stop said ram in said pumping chamber when said circuit is de-energized by actuation of a limit switch to seal said hopper and prevent backflow of manure from said pumping chamber into said hopper.

* * * * *